(12) United States Patent
Murayama et al.

(10) Patent No.: US 6,684,312 B1
(45) Date of Patent: Jan. 27, 2004

(54) MEMORY MANAGING METHOD USED IN ADDING MEMORY AND INFORMATION PROCESSING APPARATUS

(75) Inventors: Hideki Murayama, Kunitachi (JP); Kazuo Horikawa, Yokohama (JP); Hiroshi Yashiro, Kawasaki (JP); Masahiko Yamauchi, Sagamihara (JP); Yasuhiro Ishii, Hadano (JP); Daisuke Sasaki, Ebina (JP)

(73) Assignee: Hitachi, Ltd., Tokyo (JP)

( * ) Notice: Subject to any disclaimer, the term of this patent is extended or adjusted under 35 U.S.C. 154(b) by 39 days.

(21) Appl. No.: 09/227,740

(22) Filed: Jan. 8, 1999

(30) Foreign Application Priority Data

Jan. 9, 1998 (JP) .......................... 10-002796
Dec. 25, 1998 (JP) .......................... 10-369019

(51) Int. Cl.[7] .......................... G06F 12/00; G06F 13/00
(52) U.S. Cl. .......................... 711/170; 711/100; 711/154
(58) Field of Search .......................... 710/56; 711/2, 711/5, 170, 172, 154, 202

(56) References Cited

U.S. PATENT DOCUMENTS

| | | | | |
|---|---|---|---|---|
| 4,403,283 A | * | 9/1983 | Myntti et al. .......... | 711/2 |
| 4,860,252 A | * | 8/1989 | Sykora .......... | 711/5 |
| 4,926,314 A | * | 5/1990 | Dhuey .......... | 711/172 |
| 5,535,368 A | * | 7/1996 | Ho et al. .......... | 711/170 |
| 5,581,736 A | * | 12/1996 | Smith .......... | 711/170 |
| 5,608,606 A | * | 3/1997 | Blaney .......... | 361/686 |
| 5,664,139 A | * | 9/1997 | Spurlock .......... | 711/202 |
| 5,764,968 A | * | 6/1998 | Ninomiya .......... | 713/601 |
| 5,802,278 A | * | 9/1998 | Isfeld et al. .......... | 709/249 |
| 5,951,658 A | * | 9/1999 | Daray, Jr. et al. .......... | 710/56 |
| 6,336,176 B1 | * | 1/2002 | Leyda et al. .......... | 711/170 |

OTHER PUBLICATIONS

English translation of: Hitachi Personal Computer Flora 1010DI/DM: Your First PC (Manual of Hardware), pp. 107–110.
English translation of: Nikkei Electronics, Jun. 2, 1997, pp. 109–112.
Architecture of UNIX Kernel Magic System V, Release No. 4, B. Goodheart et al, published by Prentice Hall, pp. 80–85.
Hitachi Personal Computer Flora 1010DI/DM: Your First PC (Manual on Hardware), pp. 107–110.
Nikkei Electronics, Jun. 2, 1997, pp. 109–112.
"Architecture of UNIX Kernal Magic System V, Release 4", B. Goodheart et al, published by Prentice Hall, pp. 80–85.

* cited by examiner

Primary Examiner—Tuan V. Thai
(74) Attorney, Agent, or Firm—Mattingly, Stanger & Malur, P.C.

(57) ABSTRACT

An information processing apparatus for allowing a memory to be added thereto while being powered. The apparatus comprises a processor, a first main memory initially connected, and a connecting switch. The switch connects the processor, the first main memory, and a second main memory to be added. Main memory management information in the first main memory includes the size of memory resources connected to the processor. A storage region in the connecting switch retains information about whether or not the processor is connected to each of the memories. The setup allows the apparatus to use the added memory without having to be restarted.

4 Claims, 16 Drawing Sheets

MEMORY MANAGING METHOD USED IN ADDING MEMORY AND INFORMATION PROCESSING APPARATUS

BACKGROUND OF THE INVENTION

1. Field of the Invention

The present invention relates to an information processing apparatus capable of having its main memory expanded while operating.

2. Description of the Related Art

Heretofore, to expand a memory of a system has required three steps: the system is stopped, an additional memory is installed, and the system is restarted. Such techniques are disclosed illustratively in a PC instruction manual, "Hitachi Personal Computer FLORA 1010DI/DM: Your First PC (manual on hardware)," pp. 107–110 (a Japanese publication; Cited Reference 1). This publication describes the need for expanding a memory of a personal computer with its power cable disconnected. Techniques for connecting a device to a system in operation are disclosed in "The Winn L. Rosch Hardware Bible" by Rosch, Winn L, pp. 347–356, published by Samsung America Incorporated (Cited Reference 2). The Cited Reference 2 discusses PCMCIA specifications for allowing memories to be installed or removed while power is being applied. Other techniques for connecting a device to a system in operation are disclosed in the Jun. 2, 1997 issue of Nikkei Electronics (a Japanese publication), pp. 109–112 (Cited Reference 3). Discussed in the Cited Reference 3 are PCI bus specifications for allowing components to be attached or detached during power application.

Because it has been necessary to stop power to the system when a memory is being added thereto, the expansion of memory resources has conventionally required executing two related processes: stopping the system, and initializing the system. In the case of the operating system (OS) generally used in a workstation/server environment, it has typically taken 30 to 60 minutes to stop and initialize the system, including the steps of stopping and initializing application software.

One way of adding a memory during system operation is by having recourse to a cluster system. The cluster system is constituted by a plurality of information processing apparatuses each performing a specific service. In this system, while one apparatus is being stopped, others function to provide their services continuously. One obvious disadvantage of this system is the need for preparing a plurality of information processing apparatuses.

SUMMARY OF THE INVENTION

It is therefore a first object of the present invention to provide a memory managing method for allowing a memory to be added to an information processing apparatus in operation without preparing a plurality of information processing apparatuses.

It is a second object of the invention to provide a memory managing method for reserving a management region of a first memory connected to a processor so that the processor may use an added second memory.

It is a third object of the invention to provide a memory managing method whereby the difference between a predetermined memory size and a currently installed memory size is established as an additional memory size.

In carrying out the invention and according to one aspect thereof, there is provided a memory managing method for use with an information processing apparatus comprising a first memory and a processor for processing information held in the first memory, the information processing apparatus further allowing a second memory to be added thereto while being powered, the memory managing method comprising the steps of: connecting the processor to at least one of the first and the second memories; storing sizes of the first and the second memories connected to the processor; and storing information about whether or not each of the first and the second memories is connected to the processor.

According to another aspect of the invention, there is provided a memory managing method for adding a second memory to an information processing apparatus comprising a first memory, the memory managing method comprising the steps of: establishing a total memory size for the information processing apparatus; calculating a size of an actually installed memory of the information processing apparatus when the information processing apparatus is started; allocating in the first memory a memory management region based on the total memory size; establishing management information about the actually installed memory; calculating as an expandable memory size a difference between the total memory size and the size of the actually installed memory when the second memory is added while the information processing apparatus is operating; and establishing memory management information about the expandable memory size in the first memory.

According to a further aspect of the invention, there is provided an information processing apparatus for allowing a memory to be added thereto while being powered, the information processing apparatus comprising; a first memory; a processor for processing information held in the first memory; and establishing means for establishing a total memory size for the information processing apparatus; wherein the processor calculates a size of an actually installed memory of the information processing apparatus when the information processing apparatus is started; wherein the processor allocates in the first memory a memory management region based on the total memory size; wherein the processor establishes memory management information about the actually installed memory in the first memory; wherein the processor calculates as an expandable memory size a difference between the total memory size and the size of the actually installed memory when the second memory is added while the information processing apparatus is operating; and wherein the processor establishes memory management information about the expandable memory size in the first memory.

The above features of the invention allow a memory to be added to an information processing apparatus while the latter is operating.

Other features, objects and advantages of the invention will become more apparent upon a reading of the following description and appended drawings.

DESCRIPTION OF THE PREFERRED EMBODIMENTS

Preferred embodiments of this invention will now be described with reference to the accompanying drawings.

Figure 1:
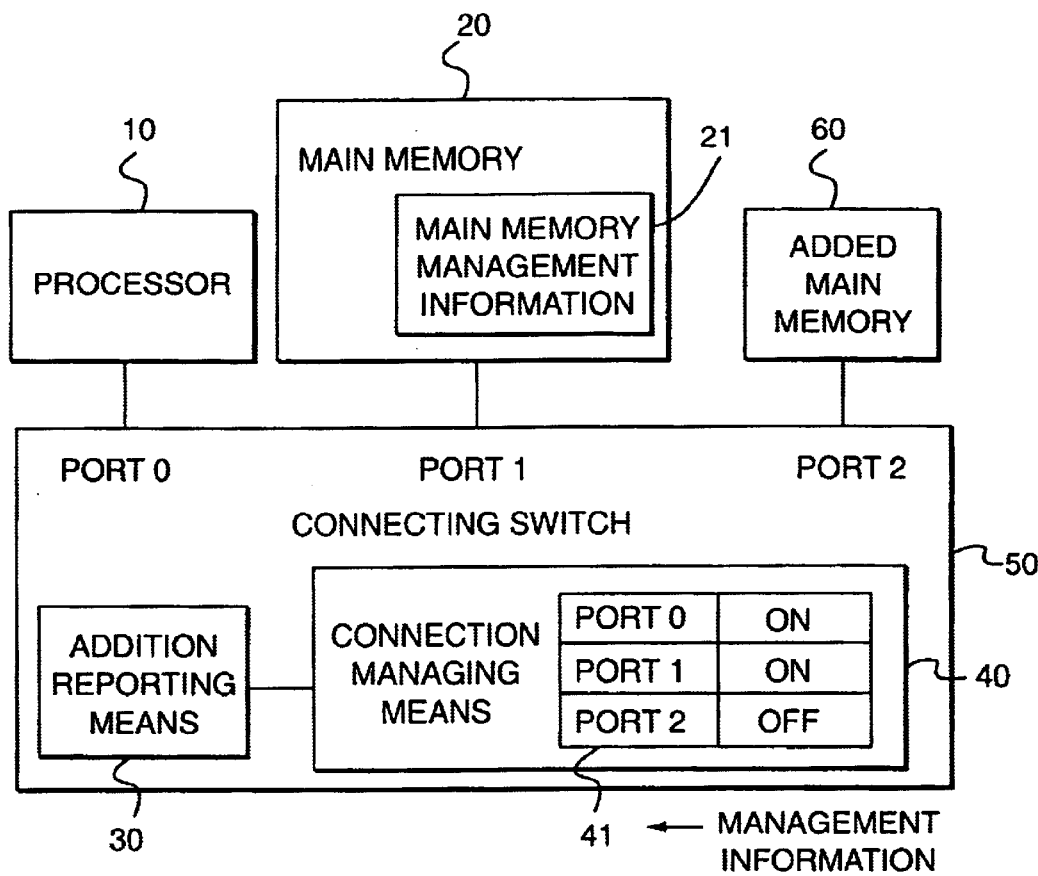
FIG. 1 is a schematic block diagram of a computer system embodying this invention.

FIG. 1 schematically outlines a constitution of a computer as an information processing apparatus embodying the invention. The computer of FIG. 1 comprises a processor 10 and a main memory 20, both connected to a connecting switch 50. An added main memory 60 is not connected to the computer when the latter starts to be powered; the memory 60 is connected to the connecting switch 50 after the computer has started operating.

The processor 10 is illustratively a CPU. The main memory 20 and the added main memory 60 are illustratively a RAM each. Made of TTL or CMOS logic circuits, the connecting switch 50 is a facility that connects the processor 10, main memory 20 and added main memory 60. The connecting switch 50 includes connection managing means 40 for managing logical connection status. Specifically, the connection managing means 40 manages the presence and absence of logical connections, i.e., the availability of signal exchanges, between the processor 10 and the connecting switch 50, between the main memory 20 and the connecting switch 50, and between the added main memory 60 and the connecting switch 50.

Management information 41 is used to manage the connection status of each of configured ports of the connecting switch 50. In the example of FIG. 1, port 0 and port 1 are in a connected state each. That is, logical connections exist between the processor 10 and the connecting switch 50, and between the main memory 20 and the connecting switch 50. There is no logical connection yet between the added main memory 60 and the connecting switch 50.

The connection managing means 40 is illustratively made up of TTL or CMOS logical circuits. The management information 41 may be held in a RAM.

In the above computer, no signals are transmitted to the parts that are not logically connected. In other words, if logically disconnected parts are physically connected, no noise is transferred therebetween; no signal exchange occurs between two physically connected parts unless they are logically connected. Upon power-up, physical and logical connections are established between the processor 10 and the connecting switch 50 as well as between the main memory 20 and the connecting switch 50, while the added main memory 60 is physically disconnected from the connecting means 50. The connecting switch 50 may be connected physically during operation but not logically. The added main memory 60 is first connected physically to the connecting switch 50 and, upon elapse of a predetermined period of time in which connection-triggered noise is allowed to disappear, the connection managing means 40 is updated to establish a logical connection between the memory 60 and the connecting-means 50. This procedure permits a memory expansion for the computer during operation.

Addition reporting means 30 for reporting an addition of parts to the computer may be implemented using a switch corresponding to each added part. In the example of FIG. 1, if individual switches are provided to represent ports 0, 1 and 2, it is possible to determine which port is to be logically connected or disconnected to or from the corresponding part by suitably setting the switches. Given a report about an addition from the addition reporting means 30, the connection managing means 40 updates the management information 41 so that the corresponding part is logically connected.

The addition reporting means 30 may be implemented by use of an input/output device comprising a program running on the processor 10, a keyboard, and a display unit. Illustratively, a character string may be input from the keyboard to alter that management information 41 in the connection managing means 40 which corresponds to the processor 10. The addition reporting means 30 thus practiced is as effective as the theoretical setup discussed above. Although the addition reporting means 30 is incorporated in the connecting switch 50 in the example of FIG. 1, this is not limitative of the invention; the addition reporting means 30 may be furnished independently of the connecting switch.

Figure 2:
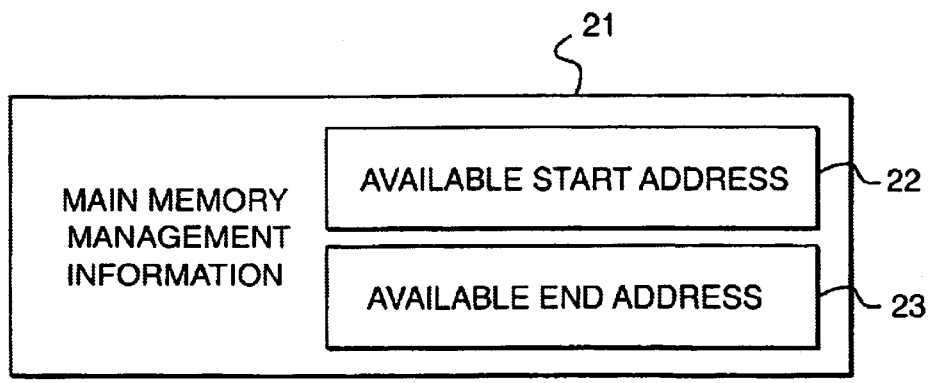
FIG. 2 is an explanatory view of main memory management information used by the computer system of FIG. 1.

In the example of FIG. 2, the processor 10 and the main memory 20 are both logically connected to the connecting switch 50 upon initialization. At this stage, the added main memory 60 is not physically connected yet. The range of memory resources that may be accessed by the processor 10 is retained in main memory management information 21 within the main memory 20. As shown in FIG. 2, the main memory management information 21 is made of an available start address 22 and an available end address 23. The available start address 22 denotes the top address that may be accessed by the processor 10, and the available end address represents the last address accessible by the processor 10.

Below is a description of the processing that takes place when a memory is added to the information processing apparatus in operation. The added main memory 60 shown in FIG. 1 is first connected to the connecting switch 50. In this state, port 2 is kept logically disconnected from the added main memory 60 by the connection managing means 40. Thus even if electrical noise is generated by a physical connection of the added main memory 60 to the connecting switch 50, the system remains free from adverse effects of the noise. Upon elapse of a predetermined period of time following the physical connection of the added main memory 60 to the connecting switch 50, an electrically stable state occurs. Once that stable state is reached, the addition reporting means 30 reports additional insertion of the added main memory 60 to the connection managing means 40. The report causes the connection managing means 40 to set to "ON" the connection status of port 2 in the management information 41. This process logically connects the connecting switch 50 to port 2 that is coupled to the added main memory 60. The connecting switch 50 allows each of the configured ports to be connected or disconnected as needed. When port 2 is disconnected to permit eventual insertion of the added main memory 60, the remaining ports may stay connected. This means that the processor 10 can gain access to the main memory 20 while the memory adding process is in progress.

The processor 10 then initializes the added main memory 60 and checks an available memory size. Finally, the processor 10 raises the available end address 23 in the main memory management information 21 (shown in FIG. 2) by an amount reflecting the additionally installed memory. This allows the processor 10 to access the added main memory 60.

Figure 3:
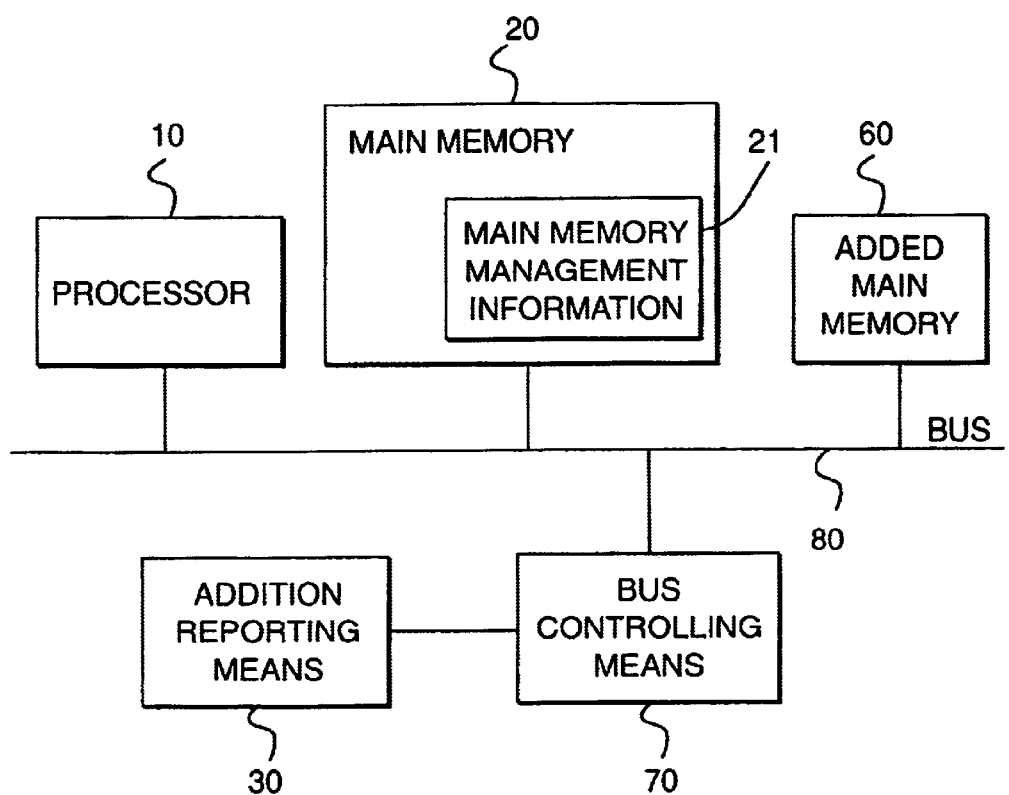
FIG. 3 is a schematic block diagram of another computer system embodying the invention.

FIG. 3 schematically outlines a constitution of a computer as another information processing apparatus embodying the invention. In FIG. 3, a processor 10, a main memory 20 and bus controlling means 70 are connected to a bus 80. The Cited Reference 2 or 3 may be referred to for techniques regarding hot-line insertion and removal in connection with this apparatus.

An added main memory 60 is not connected upon power-up; the memory 60 is connected to the bus 80 after the system has started operating.

In the above setup, connecting the added main memory 60 to the bus 80 can trigger electrical noise on the bus 80; the noise needs to be averted using bus controlling means 70. The processor 10, main memory 20 and added main memory 60 are identical to those shown in FIG. 1 except that they are interconnected by a bus structure. Illustratively made of TTL or CMOS logic circuits, the bus controlling means 70 is a feature that provides bus arbitration between components connected to the bus. The bus controlling means 70 tells each of the components connected to the bus whether or not to receive a signal over the bus as acceptable information.

Below is a description of the processing that takes place when a memory is added to the computer of FIG. 3. The noise that can be generated on the bus 80 upon connection of the added main memory 60 to the bus 80 is avoided as follows: addition reporting means 30 first reports to the bus controlling means 70 the connection of the added main memory 60 to the bus 80. In turn, the bus controlling means 70 instructs each component on the bus 80 not to accept information from the bus 80. In controlling connection and disconnection of each of the components on the bus 80, the bus controlling means 70 switches the connection and disconnection of the entire bus. The added main memory 60 is then connected to the bus 80. Upon elapse of a period of time allowing for the noise from connecting the memory 60 to the bus 80 to disappear, the addition reporting means 30 reports to the bus controlling means 70 the availability of signal exchanges over the bus 80. In this manner, a memory may be added to the computer during operation with no adverse effects of the connection-related noise reaching the components connected to the bus 80.

Thereafter, the processor 10 initializes the added main memory 60 and checks an available memory size. Finally, the processor 10 extends an available end address 23 in main memory management information 21 by an amount reflecting the additionally installed memory. This allows the processor 10 to start accessing the added main memory 60.

(First Embodiment)

Figure 4:
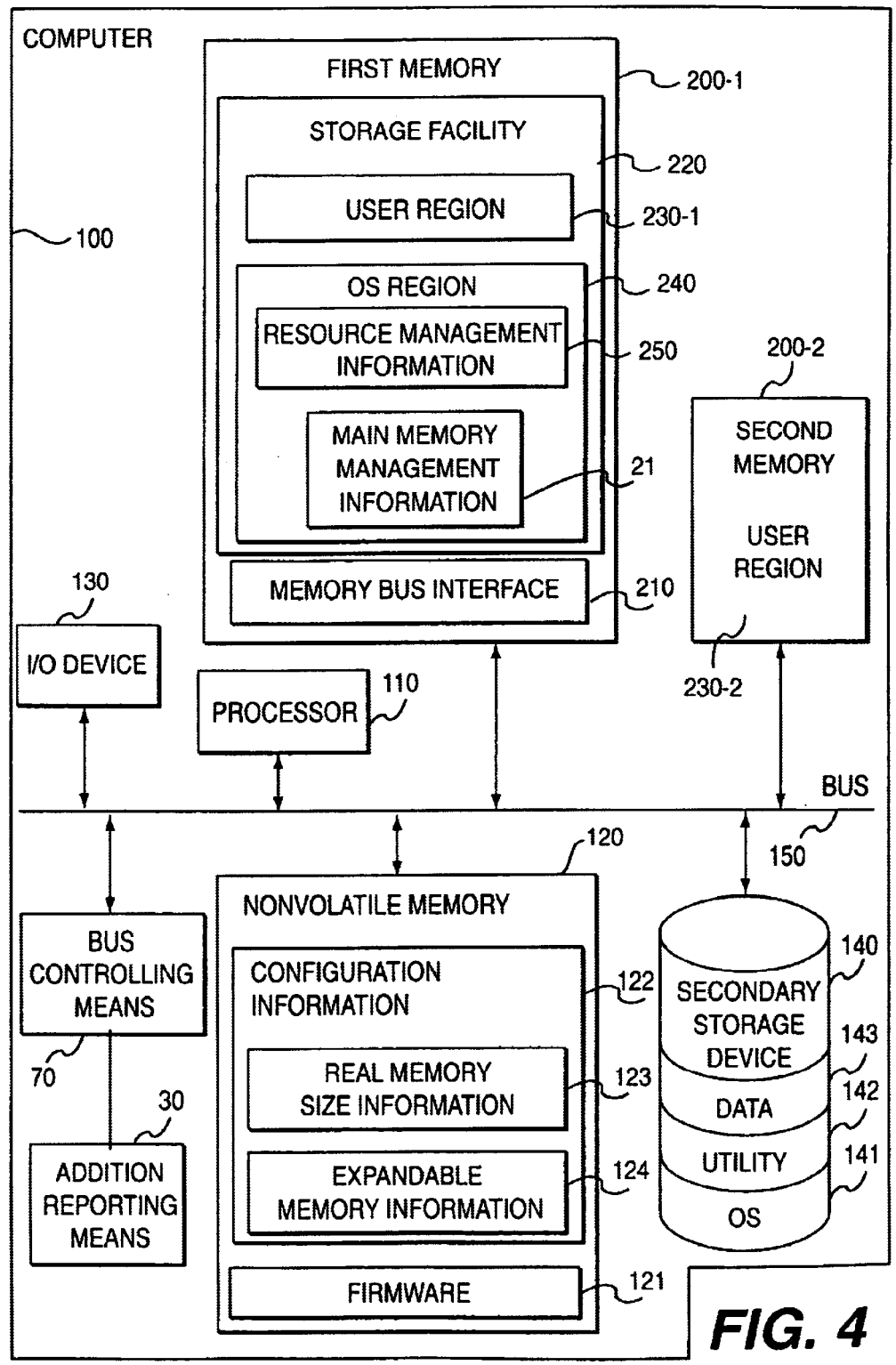
FIG. 4 is a block diagram of a computer practiced as a first embodiment of the invention.

FIG. 4 is a block diagram of a computer 100 practiced as the first embodiment of the invention. In its minimum configuration, the computer 100 comprises a processor 110, a nonvolatile memory 120, an I/O device 130, a secondary storage device 140, a first memory 200-1, a second memory 200-2 and bus controlling means 70, all connected to a system bus 150. In this example, only the first memory 200-1 is installed upon power-up and the second memory 200-2 is connected during operation following the power-up. It should be noted that according to the invention, there are no limits to the number of memories installed or to be installed at the time of or following power-up. In the ensuing description of system configurations, the memories will be referred to individually as the first and second memories 200-1, 200-2, or generically as the memory 200.

In some configurations, the computer 100 may include two or more I/O devices 130.

The processor 110 is illustratively a CPU. The nonvolatile memory 120 is a memory such as a ROM or a battery-powered RAM that retains its contents when a main power supply remains inactive. The ROM is preferably an EEPROM (Electrically Erasable Programmable Read Only Memory) The nonvolatile memory 120 comprises firmware 121 and configuration information 122.

The firmware 121 is made of a program for carrying out system initialization and basic input/output control. The configuration information 122 describes the current system configuration and is referenced by means of the firmware 121. The configuration information 122 includes real memory size information 123 indicating a currently installed memory size and expandable memory information 124 specifying an expandable memory information. The configuration information 122 is established through a setting menu of the firmware 121 and by a utility 142. Before the configuration information 122 is set or modified, restrictions associated with an operating system (OS) 141 in place should preferably be checked. The utility 142 is provided as an ordinary program.

The I/O device 130 is used to carry out input and output operations. Illustratively, a keyboard, a display unit, a printer and a network may constitute the I/O device 130.

The secondary storage device 140 retains its contents while the main power supply is being turned off. Illustratively, the storage device 140 may be a hard disk drive, an optical device such as a CD-ROM drive, a magneto-optical disk drive such as an MO drive, or a magnetic tape device. The secondary storage device 140 accommodates the OS 141, utility 142 and data 143.

The memory 200 comprises a memory bus interface 210 and a storage facility 220. Illustratively made of TTL or CMOS logic circuits, the memory bus interface 210 allows contents of the storage facility 220 to be input and output via the bus. The memory bus interface 210 also has a hot-line insertion and removal function that may be implemented illustratively by use of the PCMCIA techniques mentioned in connection with the related art.

The storage facility 220 is illustratively a RAM. A first storage facility 220-1 for the first memory 200-1 includes an OS region 240 used by the operating system and a user region 230 for use by a user program. The OS region 240 has resource management information 250 which in turn includes main memory management information 21. The second memory 200-2 comprises a second storage facility 220-2 and a user region 230-2 used by a user program. The bus controlling means 70 and addition reporting means 30 are identical to those shown in FIG. 3.

Figure 5:
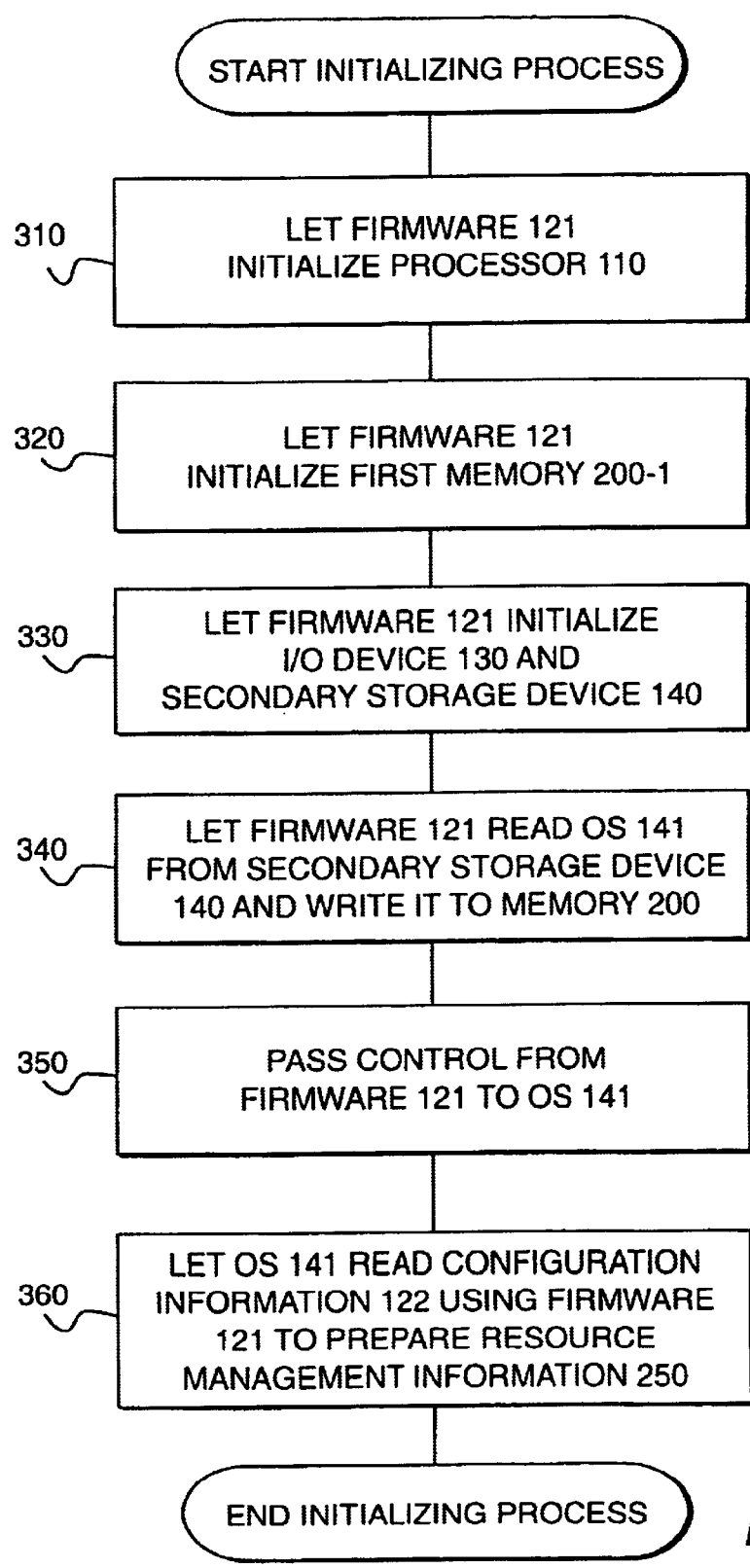
FIG. 5 is a flowchart of steps constituting an initializing process performed by the computer of FIG. 4.

An initializing process of the computer will now be described with reference to FIG. 5. In step 310, the firmware 121 initializes the processor 110. In step 320, the firmware 121 initializes the memory 200. The initializing steps allow the processor 110 normally to write and read data to and from the memory 200. In step 330, the firmware 121 initializes the I/O device 130 and secondary storage device 140. In step 340, the firmware 121 reads the OS 141 from the secondary storage device 140 and writes the OS 141 to the memory 200. In step 350, the processor 110 passes control from the firmware 121 to the OS 141. In step 360, the OS 141 using the firmware 121 reads the configuration information 122 in order to prepare the resource management information 250. This completes the initializing process.

For normal operation, programs are generally run in the user region 230. The OS region 240 is allocated in the memory 200 that was connected upon power-up. In starting a program, the OS 141 generally references the main memory management information 21 included in the resource management information 250 so as to verify an available memory region. If the memory size required for start-up of the program is found to be greater than the currently available memory size, the OS 141 cannot start the program.

Figure 6:
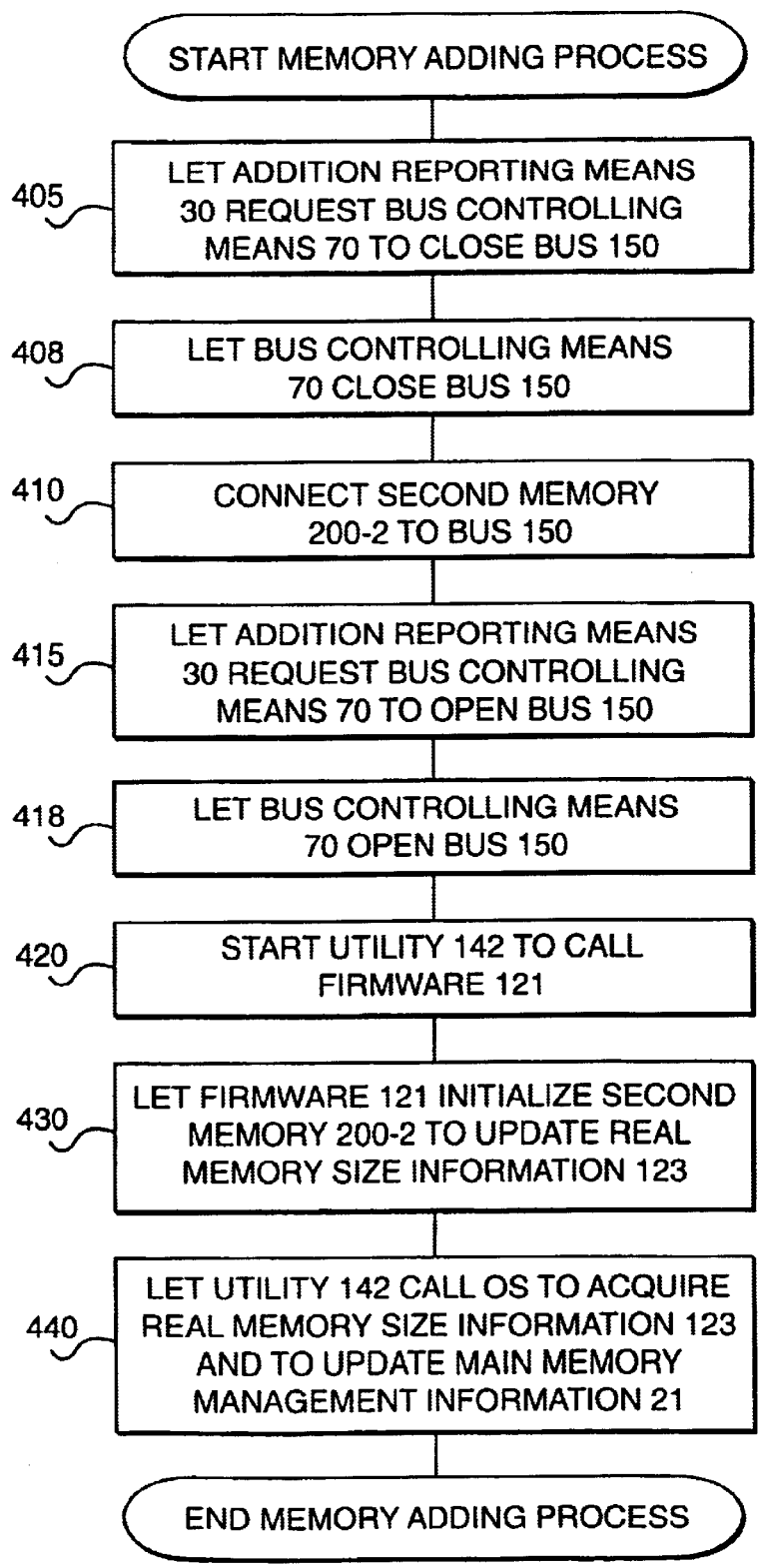
FIG. 6 is a flowchart of steps constituting a memory adding process performed by the computer of FIG. 4.

A memory adding process of the computer will now be described with reference to FIG. 6. In step 405, the addition reporting means 30 requests the bus controlling means 70 to close the bus 150. In step 408, the bus controlling means 70 closes the bus 150 accordingly. In that state, the connected components do not regard electrical signals on the bus 150 as logical signals and are thus free from adverse effects of electrical noise stemming from eventual insertion of the second memory 200-2 onto the bus 150. In step 410, the second memory 200-2 is connected to the bus 150. In some cases, this step completes the connecting process, whereupon it is necessary to wait for the connection-related noise to disappear.

In step 415, the addition reporting means 30 is controlled to request the bus controlling means 70 to open the bus 150. In step 418, the bus controlling means 70 opens the bus 150 accordingly. At this stage, the components in the system may gain access to one another over the bus.

In step 420, the processor 110 starts the utility 142 which in turn activates the firmware 121. The firmware 121 initializes the newly added second memory 200-2 in step 430 on the basis of the expandable memory information 124 included in the configuration information 122.

The utility 142 may be started in a number of ways: it may be started by an interruption issued by a bus interface, not shown, of the second memory 200-2 to the processor 110 when the second memory 200-2 is connected to the bus 150. Alternatively, the utility 142 may be started by a patrol program activated automatically at constant intervals. The utility 142 may otherwise be started by a user who enters a command.

Thereafter, based on the added memory size, the processor 110 updates the real memory size information 123 within the OS region 240 in the first memory 200-1. The processor 110 then passes control from the firmware 121 back to the utility 142. In step 440, the utility 142 calls up the OS 141. In turn, the OS 141 causes the firmware 121 to acquire the real memory size information 123 and to update the main memory management information 21. This completes the memory adding process. In the above process where the processor 110 started the utility 142 which in turn called the firmware 121 (i.e., in step 420), the processor 110 should preferably create and leave records about any memory expansion that may have been made in the secondary storage device 140 or nonvolatile memory 120.

Because the information after addition of the memory is retained in the main memory management information 21 under OS management (step 440), the added memory can be utilized by a user program that is started upon completion of the memory adding process. The main memory management information 21 is structured illustratively as shown in FIG. 2.

FIG. 4 depicts an example in which components of the computer are interconnected via a bus structure. Alternatively, these components may be interconnected by use of the connecting switch shown in FIG. 1.

Figure 7:
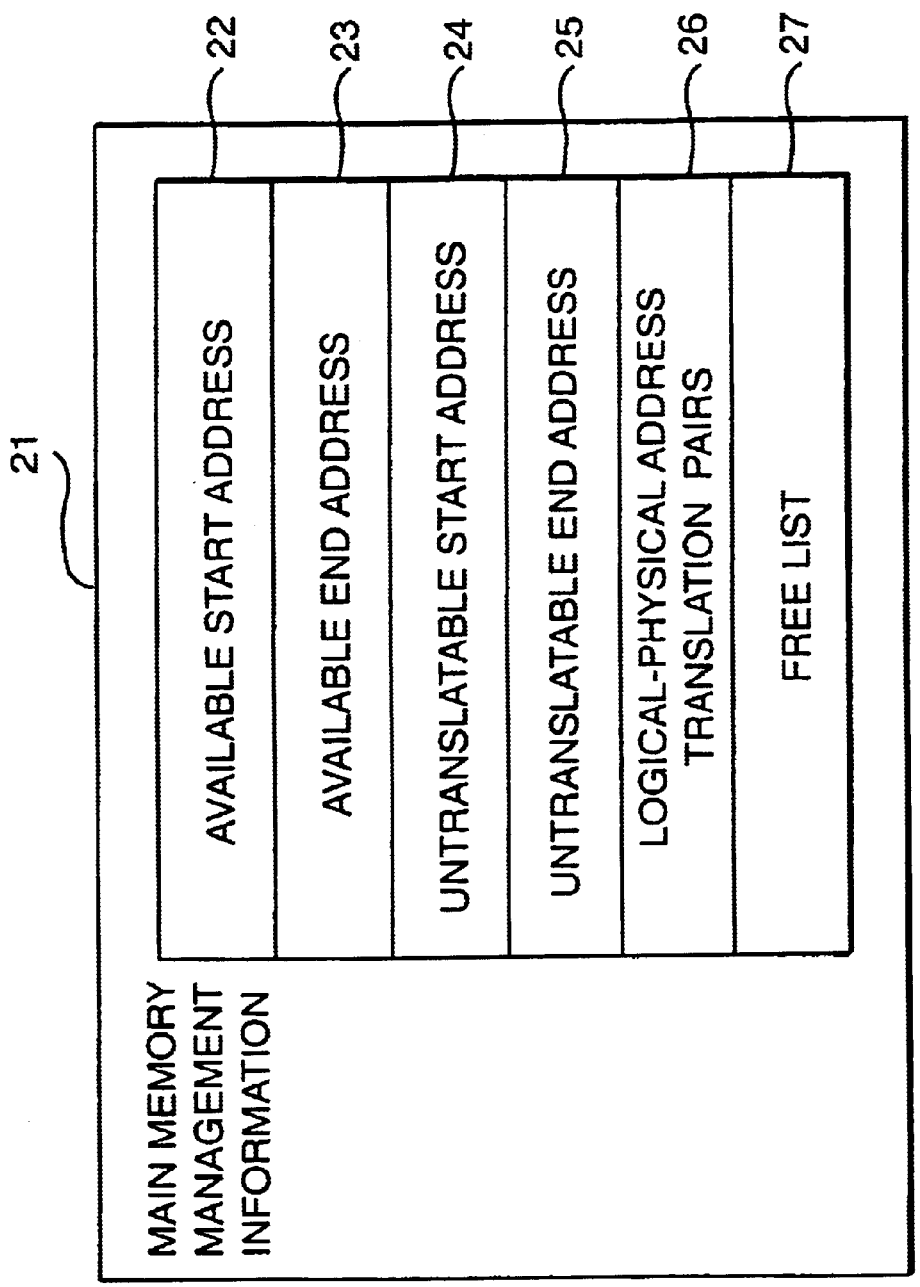
FIG. 7 is a structure diagram of main memory management information used by the computer of FIG. 4.

Described below with reference to FIG. 7 is how the invention may be applied to a computer that supports a virtual memory system. FIG. 7 schematically shows the main memory management information 21 used for virtual memory control. To perform virtual memory control involves supplementing the data of FIG. 2 (available start address 22 and available end address 23) constituting the main memory management information 21 with an untranslatable start address 24, an untranslatable end address 25, logical-physical address translation pairs 26, and a free list 27. The untranslatable start and end addresses designate a region that is not subject to address translation. The logical-physical address translation pairs 26 contain information for converting a given logical address to its corresponding physical address under virtual memory control. The free list 27 includes information for managing available memory resources. Techniques about software for virtual memory control are disclosed illustratively in "Architecture of UNIX Kernel Magic System V, Release 4," pp. 80–85, by Barney Goodheart and James Cocks, translated by Takashi Sakuragawa and published by Prentice Hall Publishing (Cited Reference 4). This publication describes techniques for installing an operating system involving virtual memory. In implementing a virtual memory system, the processor 110 is required to translate virtual addresses to physical addresses using logical-physical address translation pairs as discussed in the Cited Reference 4. Many processors 110 designed to perform virtual memory operations incorporate hardware resources called a TLE (Translation Look-aside Buffer) to perform the translation fast. Since the TLB generally does not have a sufficient capacity to cover the entire main memory, most of the logical-physical address translation pair information must reside in the main memory. If no address translation information exists in the TLB, the processor needs to acquire the information from the main memory usually in the form of interrupt handling. During interrupt handling, interruptions of the same priority are queued before they are serviced, whereas any address translation pairs should be acquired without generation of further interruptions. For that reason, the address translation pairs are retained in a region not subject to address translation. The untranslatable region is managed differently from the regions subject to address translation. As such, the untranslatable region needs to be reserved in advance. The reserved region may comprise such structures as the logical-physical translation pairs 26 and the free list described in the Cited Reference 4. What is included in the reserved region differs from one operating system 141 to another in use. What follows is a description of the OS 141 reserving a region in which to retain illustratively the logical-physical address translation pairs 26 and the free list 27. The region reserving process is accomplished by adding a necessary data size to an area defined by the untranslatable start address 24 and untranslatable end address 25 designating the untranslatable region in FIG. 7.

Figure 8:
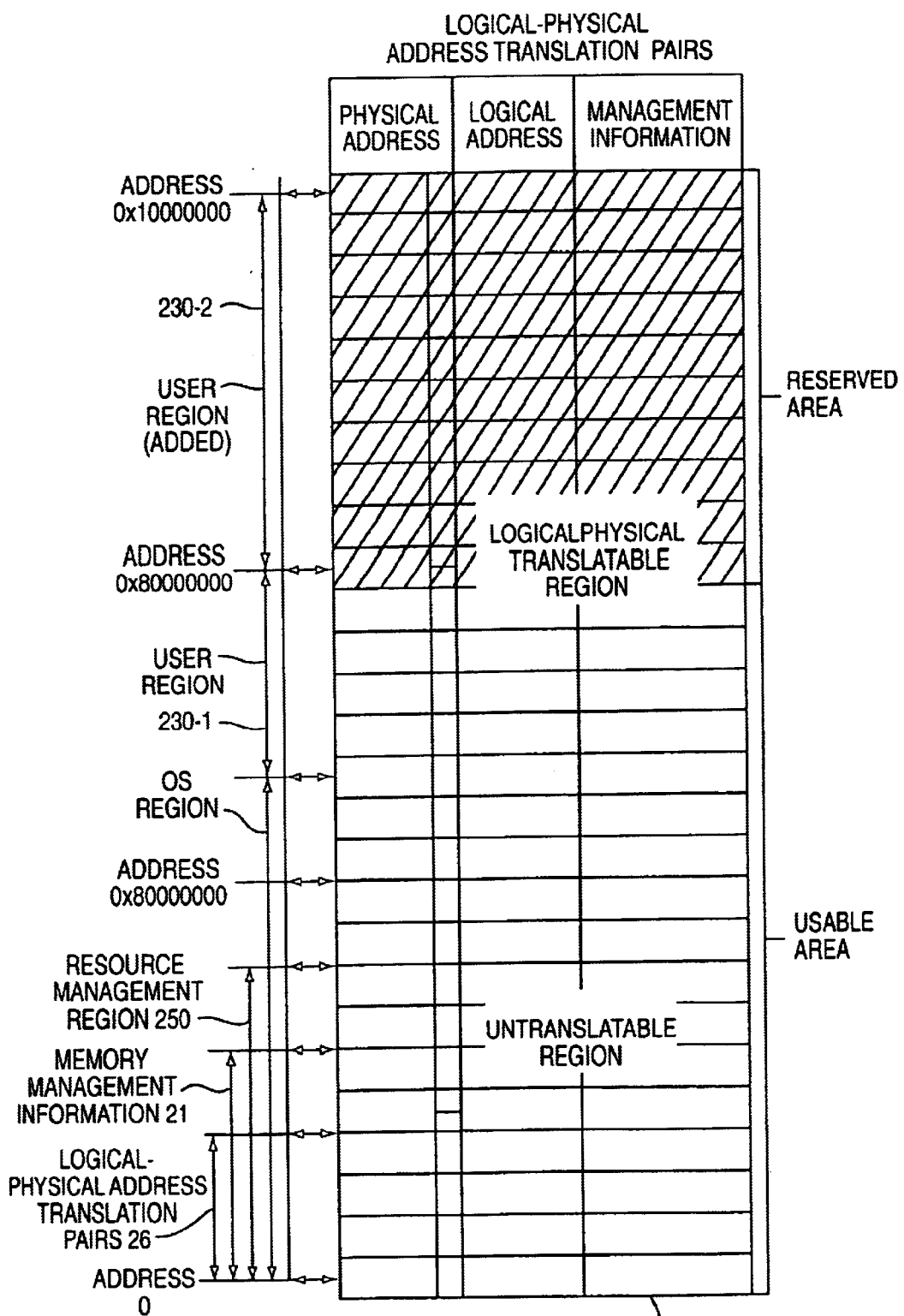
FIG. 8 is a data structure diagram in effect when virtual address control is applied to the computer of FIG. 4.

Described below in detail with reference to FIG. 8 is how the logical-physical address translation pairs 26 and the addresses involved are managed. FIG. 8 shows the logical-physical address translation pairs 26 in conjunction with data arrangements in the main memory. They are effect when the computer of FIG. 4 has for its first memory 200-1 a memory size ranging from address 0x0 to address 0x80000000, and has for its second memory 200-2 a reserved expandable memory size ranging from address 0x80000000 to address 0x100000000. The logical-physical address translation pairs 26 reside in the main memory management information 21 inside the OS region 240, i.e., a region not subject to address translation. In the example of FIG. 8, the untranslatable region ranges from address 0 to address 0x2000000. In FIG. 7, the untranslatable start address 24 is set to address 0 and the untranslatable end address 25 to 0x2000000. only the first memory (200-1 in FIG. 4) is accessible before memory expansion, and the available memory size ranges from address 0 to address 0x80000000. Thus in FIG. 7, the available start address 22 is set to address 0 and the available end address 23 to 0x80000000. After memory expansion, the first and the second memories (200-1 and 200-2 in FIG. 4) are made available for use. Then the available memory size ranges from address 0 to address 0x100000000. As a result, the available end address 23 in FIG. 7 is set to address 0x100000000.

It is necessary to reserve beforehand a region for the second storage facility 220-2 planned to be added. Because the reserved region must exist inside a storage facility in effect upon power-up, that region needs to be allocated in the first storage facility 220-1.

When such a region is reserved, the user region is reduced by an amount that would have been made available if the region had not been set aside. It is therefore desirable for the computer to present guidelines by which to determine the size of the region to be reserved. Below is a description of what the utility 142 does when a region is to be reserved.

A region reserving process performed by the utility 142 is described below with reference to FIG. 9. In step 510, the utility 142 calculates a monopolized main memory size required with respect to a virtual memory size to be reserved. The calculations are performed either by checking source programs of the OS 141 or by providing a system call that serves as an interface through which the OS 141 carries out reporting. Either way, the calculating step is implemented through preparation of a utility based on checks of the internal structure of the OS 141. Information about PA-RISC logical-physical address translation pairs 252 is disclosed illustratively in "PA-RISC 2.0 ARCHITECTURE" by Gerry Kane, pp. 3–9 to 3–16, published by Prentice Hall Publishing (Cited Reference 5). This publication discusses hardware and software resources needed to implement virtual memory schemes. As described in the Cited Reference 5, the information about the logical-physical address translation pairs 252 shown in FIG. 7 is composed of 32 bytes for each page (e.g., of 4 kilobytes). That size varies from one operating system 141 to another being used; the information may or may not be constituted exactly by 32 bytes per page with PA-RISC 2.0. The free list may be composed illustratively of 8 bytes per page if the list accommodates addresses representing the address translation pair information. The size of the free list may also vary from one operating system 141 to another in use. The memory size for the utility 142 and other necessary resources is calculated in accordance with the OS 141 that is used.

In step 520, the utility 142 determines a reservable upper limit based on a currently installed memory size and on the results obtained in step 510. A minimally required memory size is defined for each operating system in advance. To have the OS 141 function normally requires that the current memory size minus the memory size representing a page structure of the added memory be at least equal to the minimally required memory size. A comparison is made between two values: one value is an added memory size determined so that the currently installed memory size minus the memory size representing the page structure of the added memory may become the minimum memory size; the other value is the maximum expandable memory size of the system minus the currently installed memory size. Of the two values compared, the smaller value is regarded as a maximum value that may be set to the expandable memory information 124; value zero is taken as a minimum value that may be set to the expandable memory information 124. The page structure signifies a data region for page management. with this invention, the page structure is made up of the logical-physical address translation pairs 26 and free list 27 shown in FIG. 7.

In step 530, the utility 142 allows the user to select a value within the range of sizes defined above, and establishes the selected value. The value thus established is preferably written as a file to the secondary storage device 140 so that the value may be referenced by the utility 142.

Figure 10:
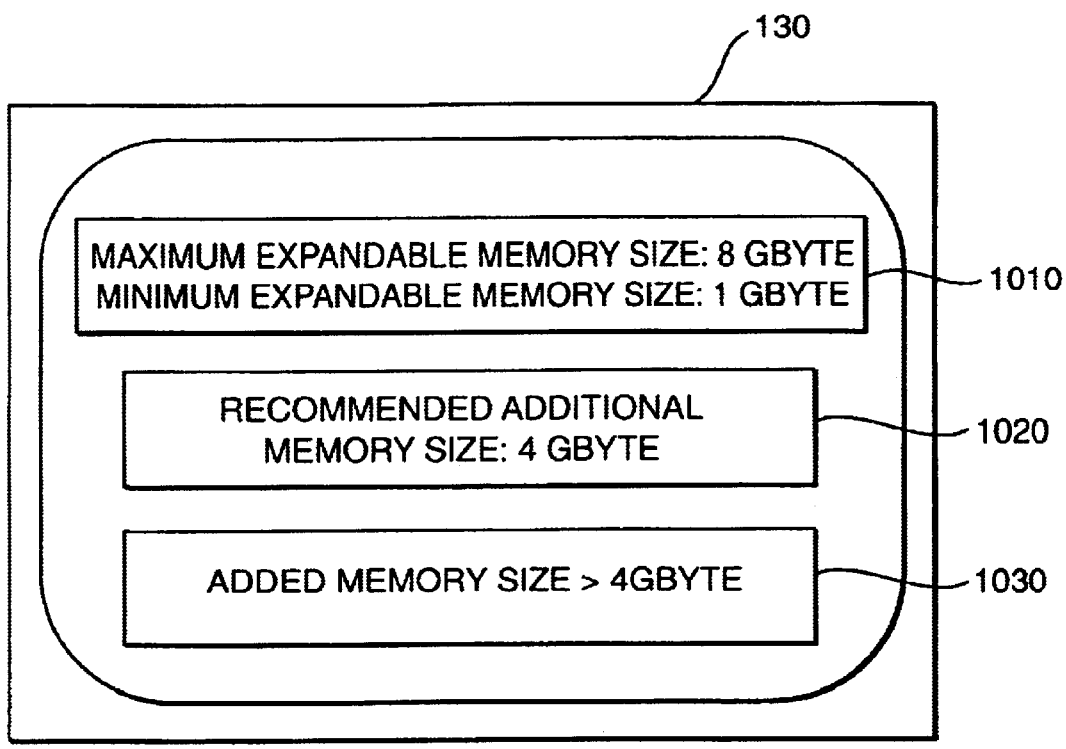
FIG. 10 is a view of a screen image showing a user interface of the computer of FIG. 4.

Finally in step 540, the utility 142 sets to the expandable memory information 124 the value determined in step 530. FIG. 10 shows an interface used to carry out the memory setting. As shown in FIG. 10, the I/O device 130 displays a maximum and a minimum expandable memory size 1010, a recommended additional memory size 1020, and an added memory size input field 1030. Interface arrangements may be made so that entries through the added memory size input field 1030 are allowed to vary only between the maximum and the minimum expandable memory sizes, for example, by shifting a cursor upwards or downwards, with a selected value entered by a return key operation. Such arrangements will prevent any abnormal value from being entered through the added memory size input field 1030.

It is preferred that users be offered information specifying recommended system configurations such as memory sizes and the number of processors, as well as recommended expandable memory sizes contingent on the objective of the system. For example, half of a maximum value that may be set to the expandable memory information 124 is offered as a recommended expandable memory size.

Initialization of a computer implementing virtual memory is described below. The basic flow of processing is the same as that described with reference to FIG. 5, except for some variation in step 360. That is, in preparing the resource management information in step 360, the OS 141 allocates inside the untranslatable region a data area for the logical-physical address translation pairs 26 corresponding to an expandable memory region as well as for the free list 27. For any unavailable area, the OS 141 using the firmware 121 acquires the real memory information 123 and expandable memory information 124 from inside the configuration information 122. With regard to the memory defined by what is contained in the expandable memory information 124, the OS following its normal initialization reserves resources using page lock techniques for page structures described in the Cited Reference 4, with no entry made into the free list 27. This puts the above-defined memory area out of the range of control and management by the OS for data region allocation. As a result, resources for the information about the added memory are reserved so that the corresponding memory regions are made unavailable for general use. To reserve resources signifies that, with the page structure for the expandable memory placed in an untranslatable region, the number of addresses between the untranslatable start address 24 and the untranslatable end address 25 is increased by the memory size corresponding to the page structure for the expandable memory.

How a memory is added to a computer implementing virtual memory is described below. The basic flow of processing is the same as that described with reference to FIG. 6, except for some variation in step 440. That is, when the utility 142 calls the OS in step 440, the OS in turn reserves resources using the page lock techniques for page structures described in the Cited Reference 4, with no entry made into the free list 27. This cancels the status of the memory area being moved out of the range of control and management by the OS for data region allocation, and the main memory management information 21 is updated. The step brings about a state equivalent to the normal memory presence, whereby the system is made usable without another initialization.

(Second Embodiment)

In practicing the second embodiment, the inventors considered a computer which has functions for detecting failures of the memory 200 and for closing a failed memory portion and which is booted if the normally operating memory size minus the failed memory portion is at least equal to a minimum memory size needed to boot the OS (as discussed with reference to FIG. 9). Equipped with a memory adding function, such a computer may have its utility 142 allocate a management region for an expandable memory. In that case, a shortage of the normally operating memory size can prevent the computer from being booted. That is, there is a possibility that a computer that was usable when its memory adding function was not in use may become unusable when that function is employed.

The problem above is circumvented by the second embodiment of this invention wherein, if the normally operating memory size in effect at the time of setting an expandable memory size is less than the normally operating memory size at the time of booting, the expandable memory size setting is invalidated. The computer is then booted with the expandable memory size set to zero.

Figure 11:
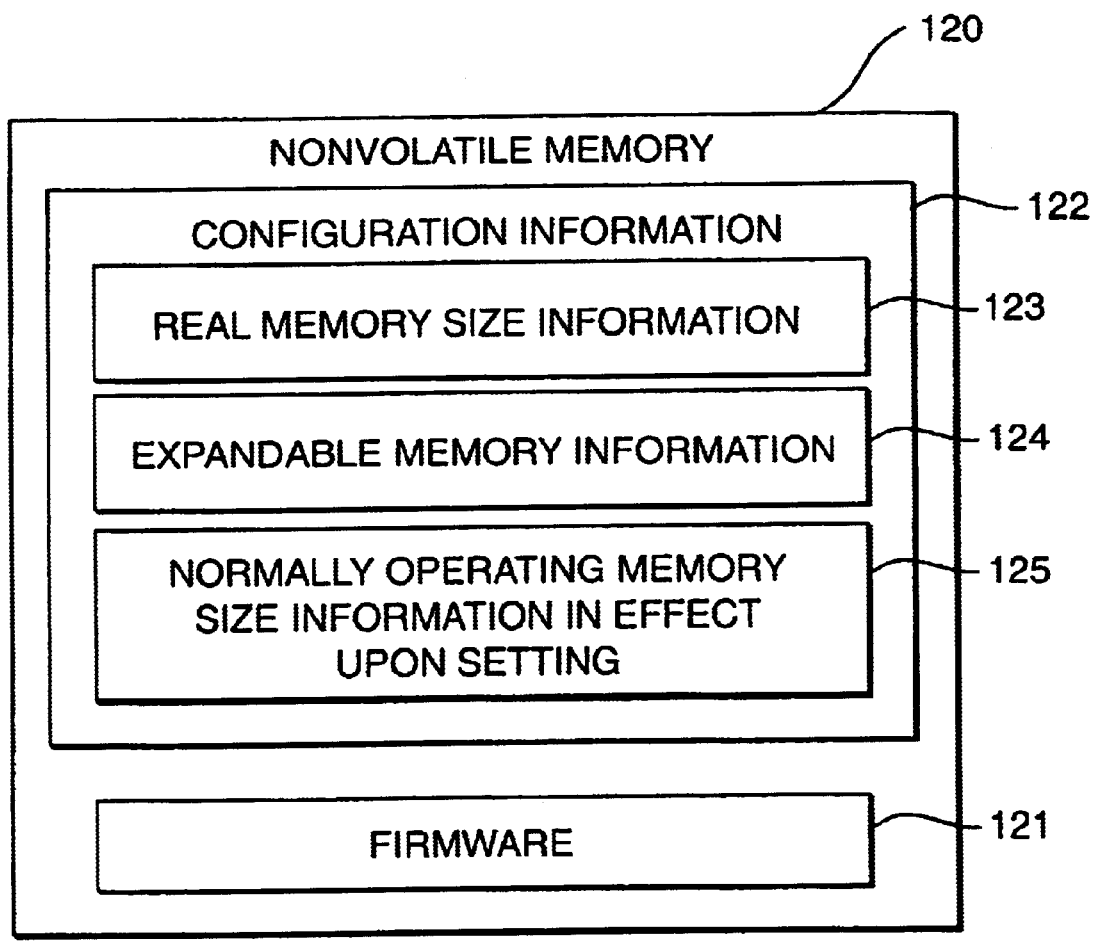
FIG. 11 is a structure diagram of a nonvolatile memory used by a second embodiment and comparable to the nonvolatile memory of the computer in FIG. 4.

The second embodiment will now be described in more detail. FIG. 11 is a structure diagram of a nonvolatile memory used by the second embodiment and comparable to the nonvolatile memory 120 of the first embodiment in FIG. 4. For the second embodiment, the contents of the nonvolatile memory 120 are supplemented with normally operating memory size information 125 at the time of the memory information setting. The normally operating memory size information 125 is the information in effect when the user sets an expandable memory size to the expandable memory size information 124.

Figure 12:
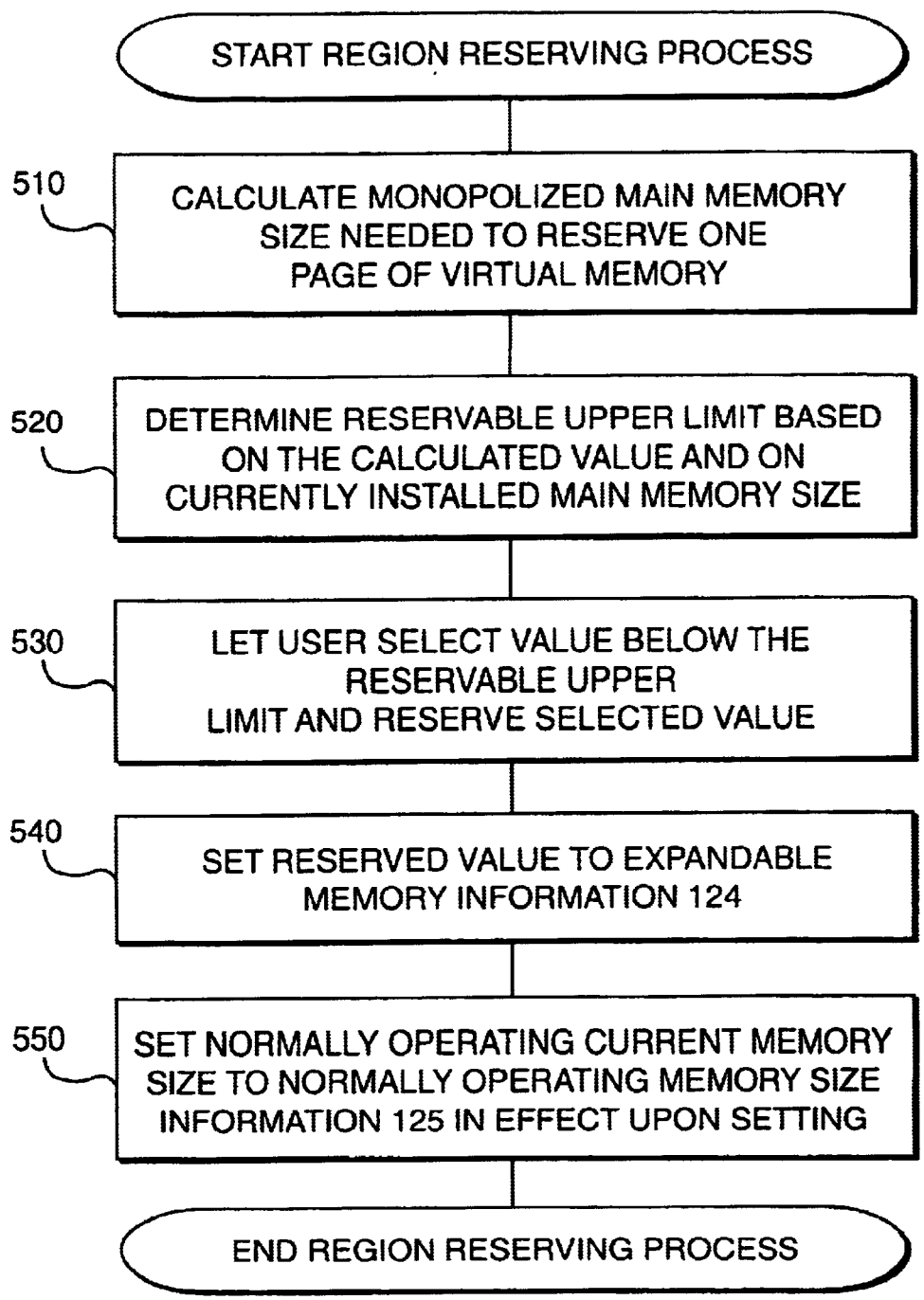
FIG. 12 is a flowchart of steps constituting a region reserving process performed by the second embodiment.

FIG. 12 is a flowchart of steps constituting a region reserving process performed by the second embodiment. The flowchart is a variation of what is shown in FIG. 9 for the first embodiment, supplemented by step 550 for setting normally operating memory size information 125 in effect at the time of memory information setting. In step 550, the user sets the currently effective normally operating memory size to the normally operating memory size information 125 in effect at the time of the memory information setting.

Figure 13:
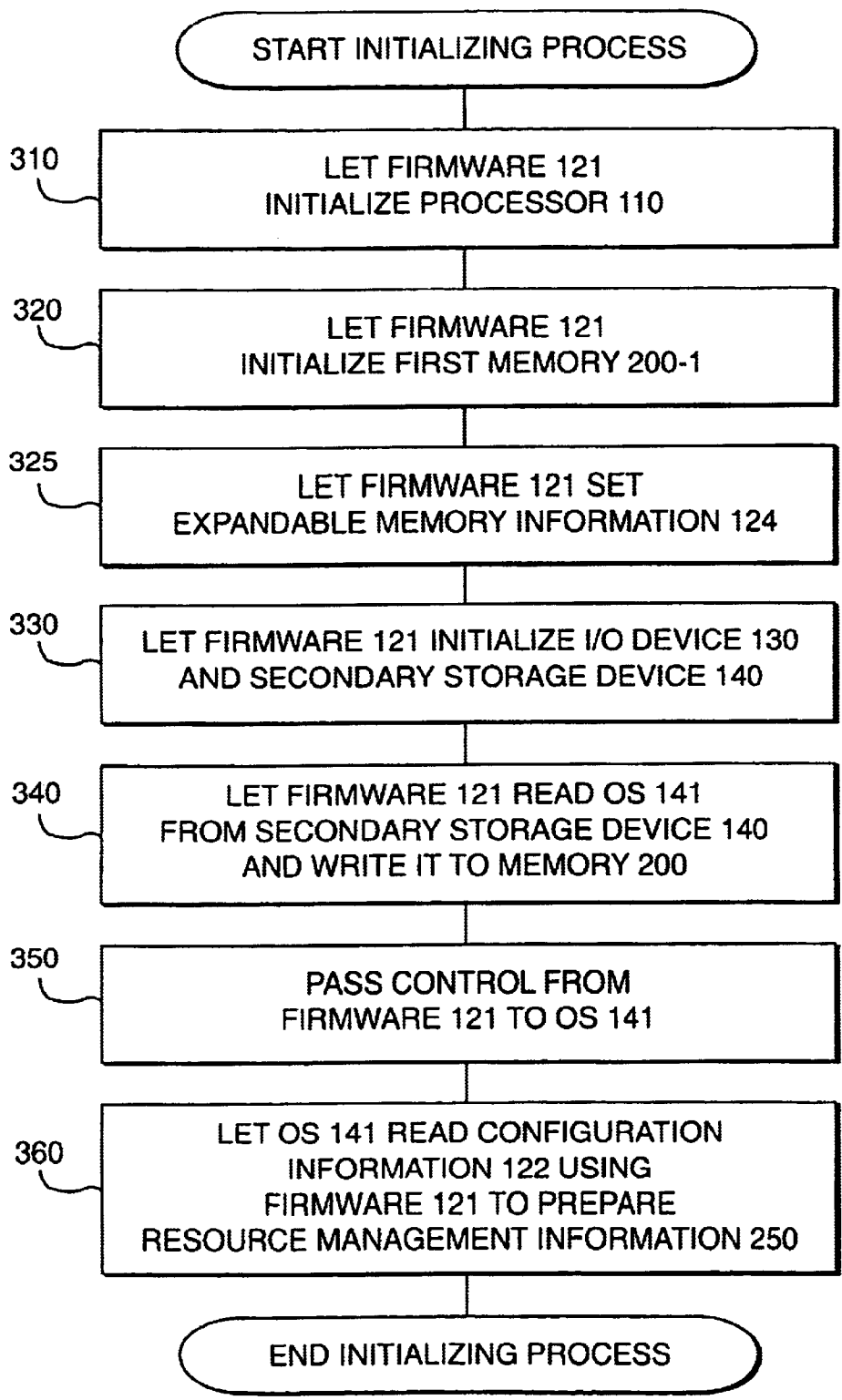
FIG. 13 is a flowchart of steps constituting an initializing process performed by the second embodiment.

FIG. 13 is a flowchart of steps constituting an initializing process performed by the second embodiment. The flowchart is a variation of the flowchart in FIG. 5 for the first embodiment, supplemented by step 325 added after step 320 for memory initialization. In step 325, the firmware 121 sets the expandable memory size information 124.

Figure 14:
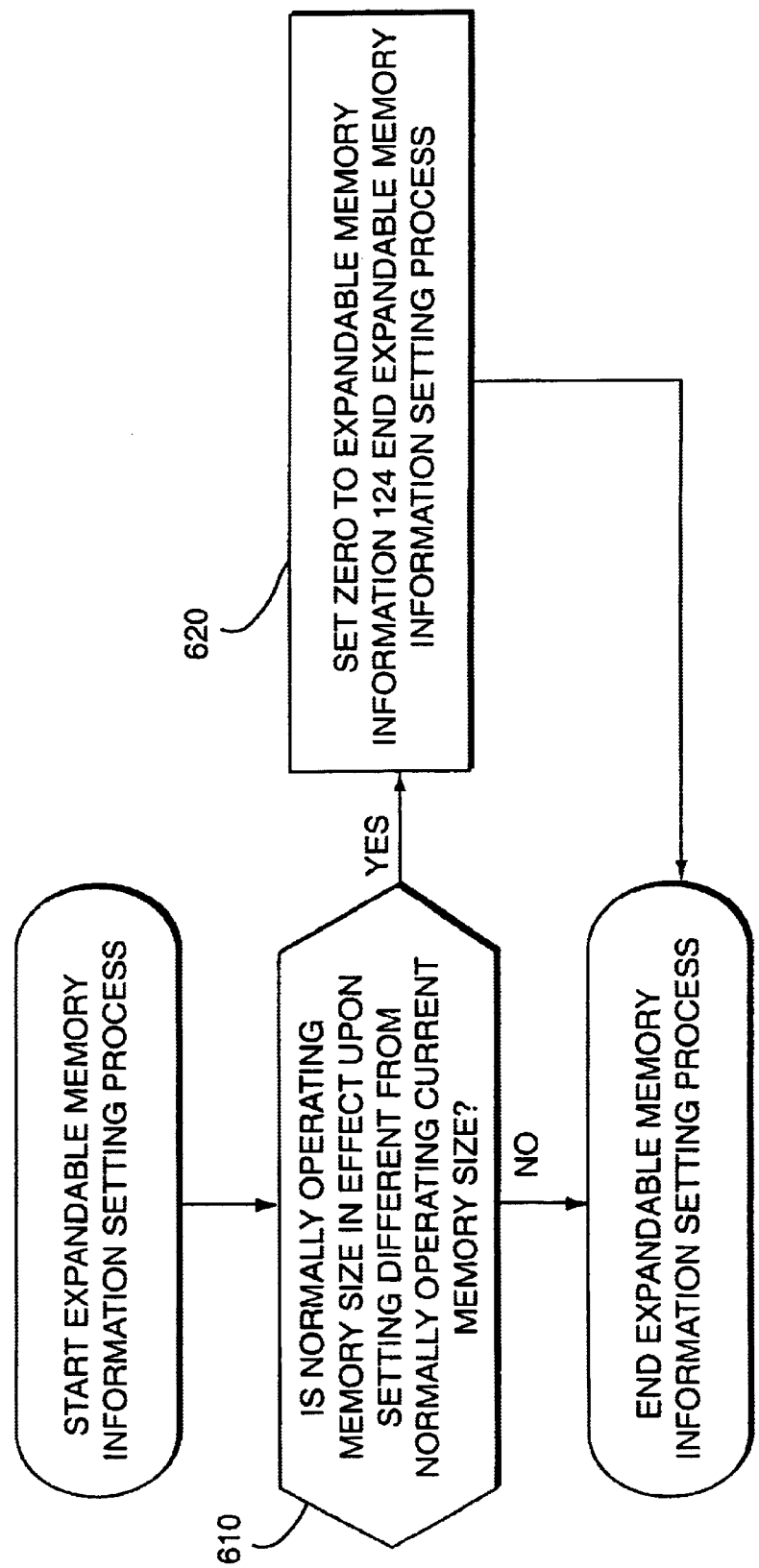
FIG. 14 is a flowchart of steps constituting a process of setting expandable memory size information performed by the second embodiment during initialization.

FIG. 14 is a detailed flowchart of step 325 in FIG. 13 for setting the expandable memory size information 124. In step 610, the firmware 121 compares the normally operating memory size information 125 in effect at the time of the memory information setting, with the normally operating memory size at the time of booting. The compared sizes differ from each other, step 620 is reached. If the two sizes are identical, the processing is terminated. In step 620, value 0 is set to the expandable memory size information 124.

The interface with the other portions of the computer concerns the expandable memory information 124. This means that these portions of the computer of the second embodiment are the same with those of the first embodiment.

(Third Embodiment)

In practicing the third embodiment, the inventors considered a computer which has functions for detecting failures of the memory 200 and for closing a failed memory portion and which is booted if the normally operating memory size minus the failed memory portion is at least equal to a minimum memory size needed to boot the OS (as discussed with reference to FIG. 9). Computers of this type are characterized by the fact that their normally operating memory size can vary. This poses two problems in establishing an expandable memory size.

The first problem is that because any size of a management region designated for the expandable memory is allocated unchecked, a shortage of the normally operating memory size can occur. The memory shortage can prevent the computer from getting booted. The second problem is this: if a memory failure occurs following the setting of the expandable memory size, the sum of the normally operating memory size and the expandable memory size (called the total memory size) will become smaller than the total memory size at the time of the memory size setting.

In resolving the two problems above, the third embodiment uses the utility 142 to calculate an expandable memory size at the time of booting. There are two requirements for the calculation: (1) the normally operating memory size minus the management region for the expandable memory should not be less than the minimally required memory size; and (2) the expandable memory size should be set with a maximum available size not greater than {total memory size−normally operating memory size}.

It is required that the normally operating memory size minus the management region for the expandable memory be at least as large as the minimally required memory size. That requirement is defined by three sizes: a minimally required memory size, a memory page size, and a management region size per page.

The third embodiment will now be described in more detail. Below is an example in which a total memory size of 8 gigabytes is needed. There are two conditions to be met when the normally operating memory size minus the management region for the expandable memory needs to be at least as large as the minimally required memory size. The first condition is that the memory adding function is allowed to be used only if the normally operating memory size at the time of booting is at least "x" pages ("x" is an integer and one page makes up 4 kilobytes). The second condition is that the expandable memory size must not exceed the normally operating memory size at the time of booting multiplied by a factor of "y" ("y" is a floating-point number). The two conditions may be described as the following two expressions:

Normally operating memory size $\geq$ "x" pages (Expression 1)

Expandable memory size $\leq$ "y"$\times$normally operating memory size (Expression 2)

Figure 15:
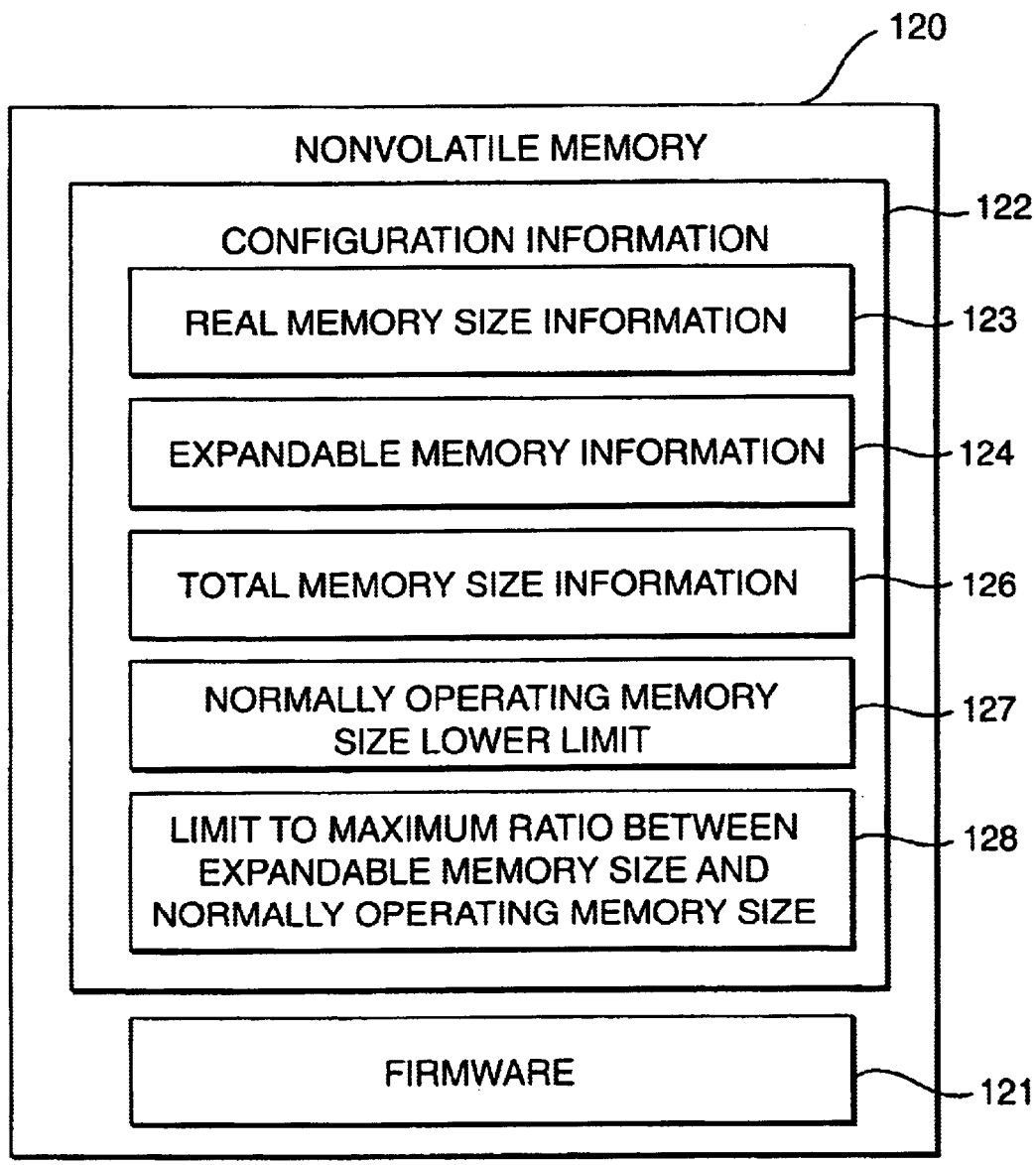
FIG. 15 is a structure diagram of a nonvolatile memory for use by a third embodiment and comparable to the nonvolatile memory of the computer in FIG. 4.

FIG. 15 is a structure diagram of a nonvolatile memory for use by the third embodiment and comparable to the nonvolatile memory 120 of the computer in FIG. 4. For the third embodiment, the contents of the nonvolatile memory 120 are supplemented with a total memory size 126, a normally operating memory size lower limit 127, and a limit 128 to a maximum ratio between an expandable memory size and the normally operating memory size. The utility 142 sets to the total memory size 126 the sum of the normally operating memory size and the expandable memory size. For the third embodiment, the sum denotes 32-bit integer memory regions designated in terms of 4-kilobyte pages. The utility 142 sets to the normally operating memory size lower limit 127 a normally operating memory size that is minimally required for the use of the memory adding function. For the third embodiment, the limit 127 denotes 32-bit integer memory regions designated in terms of 4-kilobyte pages. As the limit 128 to the maximum ratio between the expandable memory size and the normally operating memory size, the utility 142 specifies a maximum ratio between the currently expandable memory size and the normally operating memory size. For the third embodiment, the limit 128 to the maximum ratio between the expandable memory size and the normally operating memory size denotes a region in which to store 32-bit floating-point number. The third embodiment does not allow the user directly to designate the expandable memory information 124.

Figure 16:
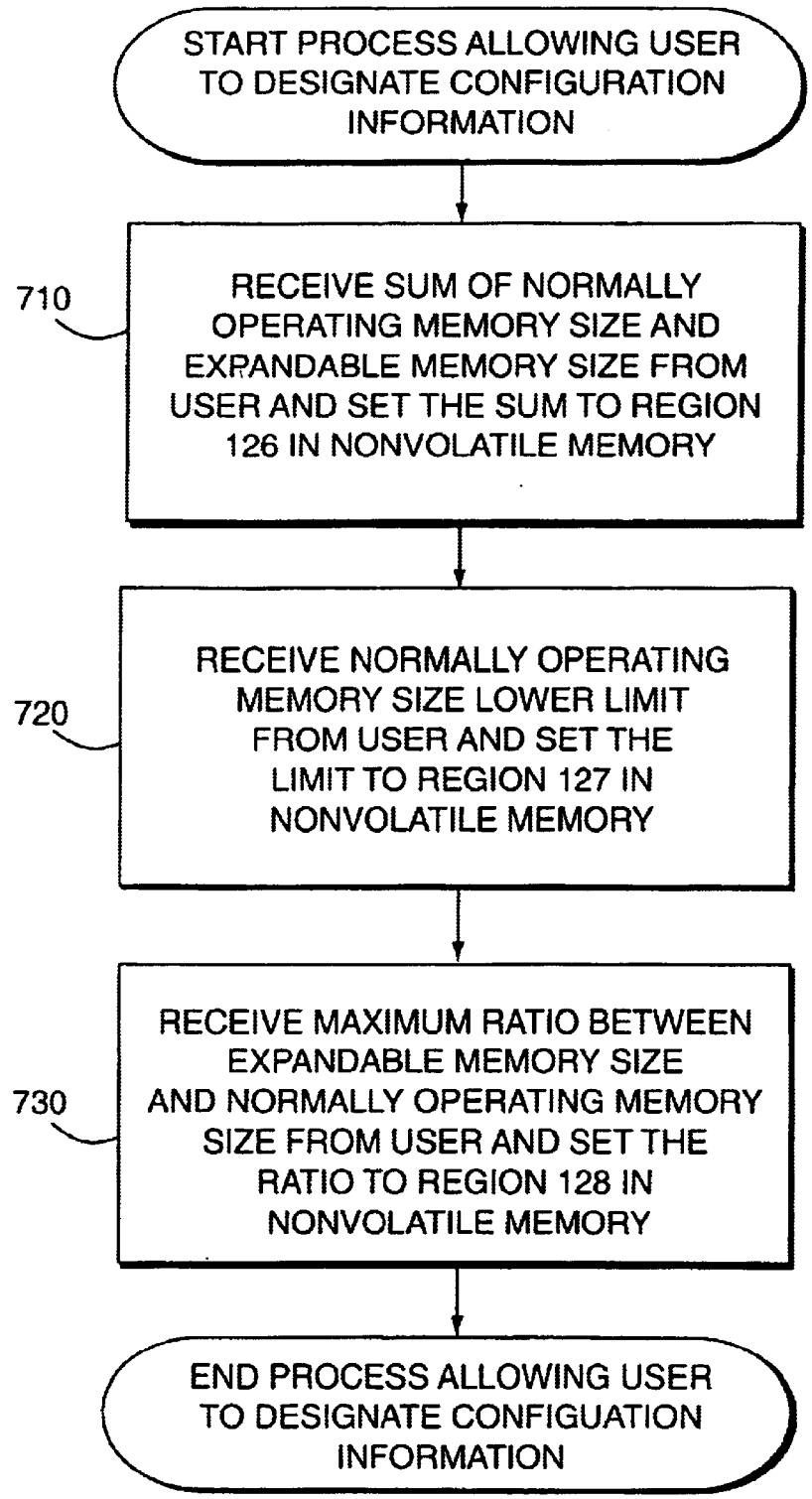
FIG. 16 is a flowchart of steps constituting a process allowing a user to designate configuration information, the process being performed by the third embodiment.

FIG. 16 is a flowchart of steps constituting a process allowing the user to designate configuration information. In step 710, the utility 142 places a total memory size requested by the user into the corresponding region (total memory size information 126) inside the nonvolatile memory 120. For example, if the user requests a total memory size of 8 gigabytes, the utility 142 sets a value of 0x200000 representing 2-megabyte pages to the total memory size information 126. In step 720, the utility 142 sets a user-designated normally operating memory size minimally required to permit memory expansion to the corresponding region (normally operating memory size lower limit 127) within the nonvolatile memory 120. Illustratively, if the user designates 1 gigabyte as the minimally required normally operating memory size, then a value of 0x40000 representing 256-kilobyte pages is set to the normally operating memory size lower limit 127. Finally in step 730, the utility 142 sets a user-designated maximum ratio between the expandable memory size and the normally operating memory size to the corresponding region (limit 128 to the maximum ratio between the expandable memory size and the normally operating memory size) inside the nonvolatile memory 120. For example, if the user designates a maximum ratio of 4.0, the utility 142 establishes the value 4.0 as the limit 128 to the maximum ratio between the expandable memory size and the normally operating memory size.

Figure 9:
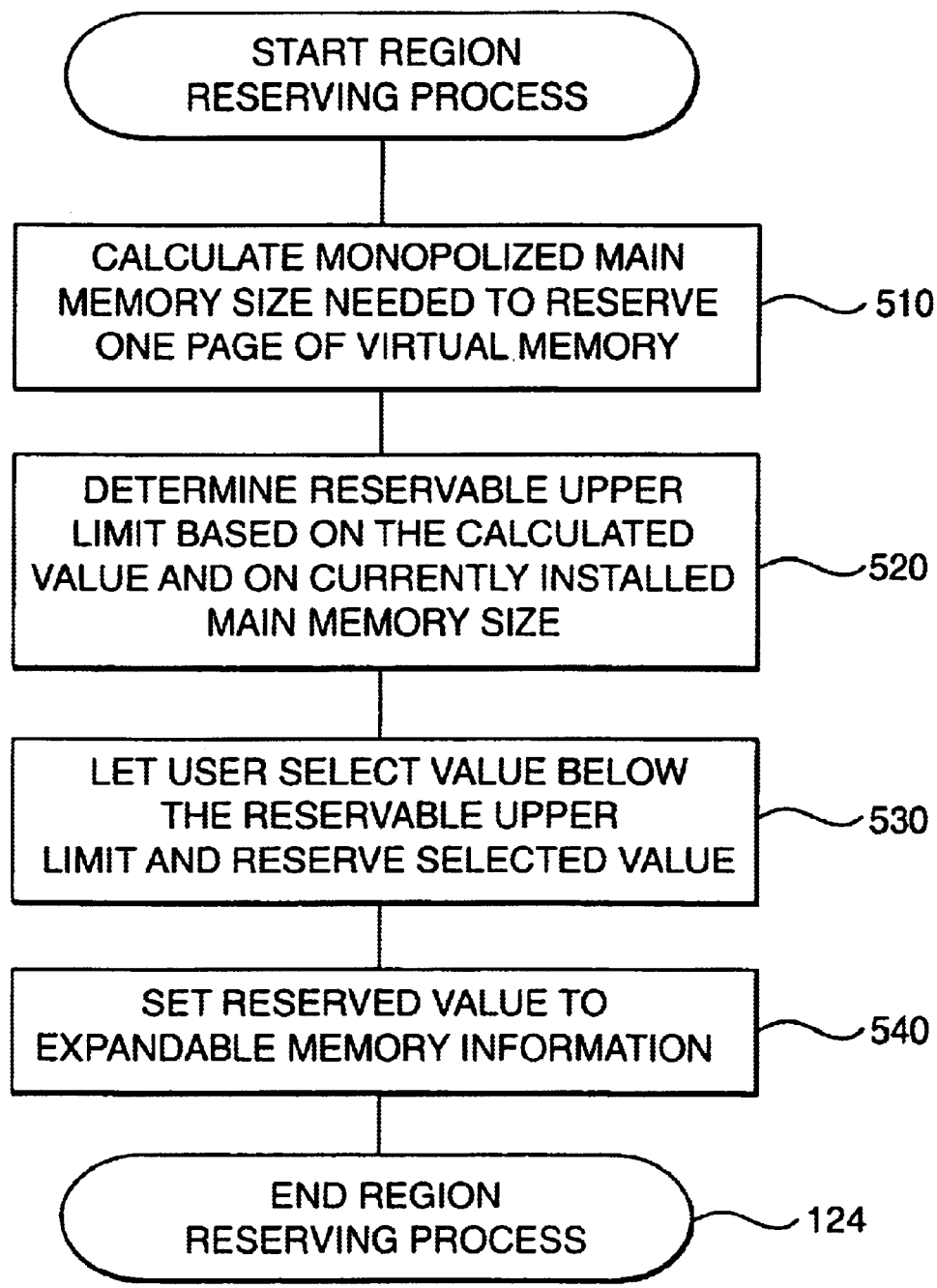
FIG. 9 is a flowchart of steps constituting a region reserving process performed by the computer of FIG. 4.

Unlike the region reserving process of FIG. 9, the process of FIG. 16 for permitting user designation of configuration information does not allow the user directly to specify the expandable memory information 124. Instead, the user directly designates the total memory size 126, i.e., the sum of the normally operating memory size and the expandable memory size.

As with the second embodiment, the computer of the third embodiment is initialized in accordance with the initializing process of FIG. 13. In step 325, the firmware 121 establishes expandable memory information 124.

Figure 17:
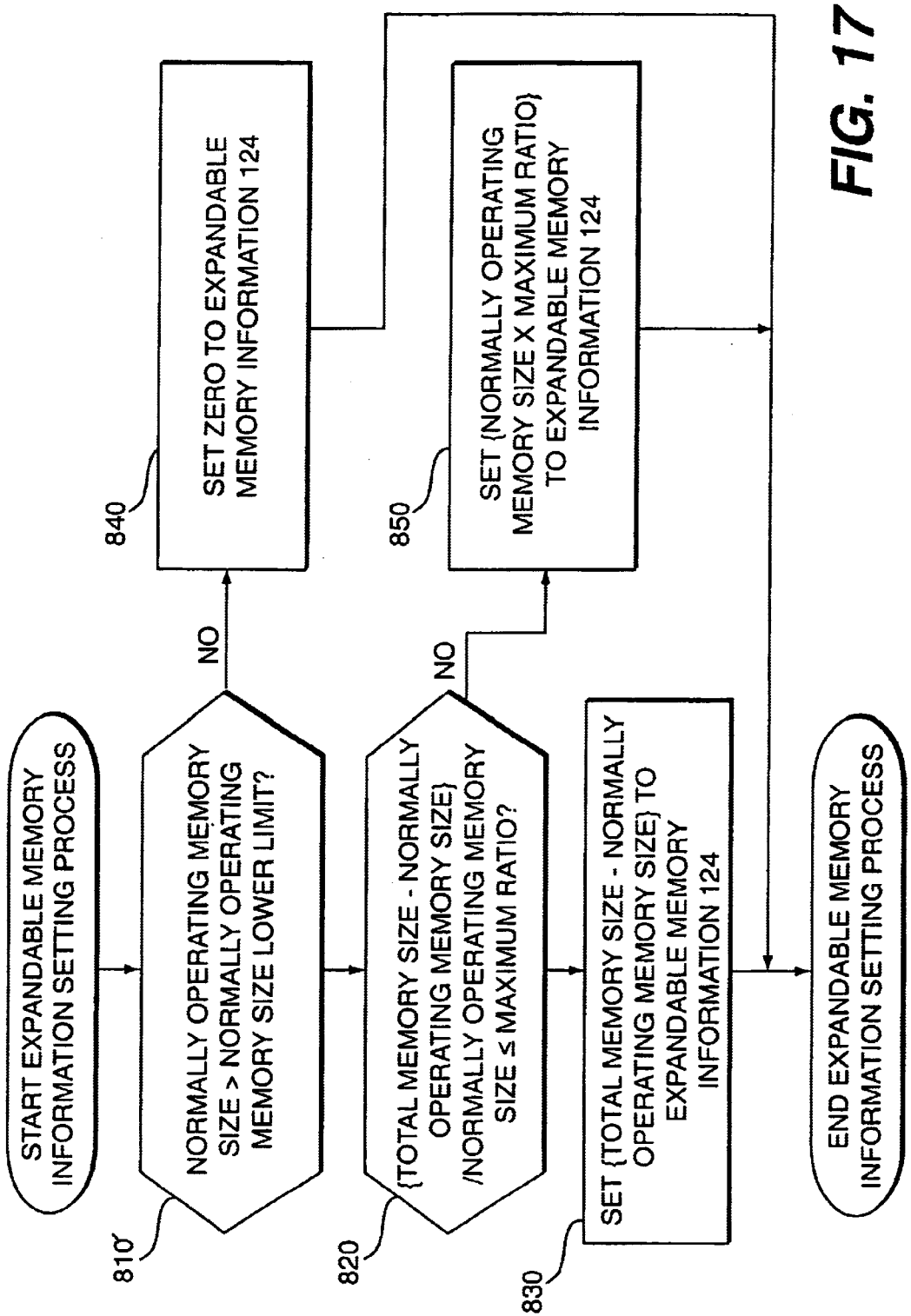
FIG. 17 is a flowchart of steps constituting a process of setting expandable memory size information performed by the third embodiment during initialization.

FIG. 17 is a flowchart of steps constituting a process of setting expandable memory information 124 performed by the third embodiment, the process detailing operations making up step 325 in FIG. 13 performed by the second embodiment. In step 810, the firmware 121 compares the normally operating memory size lower limit in the area 127 with the normally operating memory size in effect at the time of booting. If the normally operating memory size at the time of booting is the smaller of the two values, step 840 is reached. If, as described, 256-kilobyte pages have been designated (for 1 gigabyte) as the minimally required normally operating memory size, the firmware 121 verifies whether the Expression 1 is satisfied. If the normally operating memory size at the time of booting is less than 1 gigabyte, step 840 is reached. If the normally operating memory size is at least equal to the minimally required normally operating memory size, then step 820 is reached. In step 820, the firmware 121 checks to see if:

{total memory size−normally operating memory size at the time of booting}/normally operating memory size at the time of booting $\leq$ maximum ratio If the result of the check in step 820 is negative, step 850 is reached; if the result is affirmative, step 830 is reached. The total memory size is the value held in the total memory size information 126 shown in FIG. 15. The maximum ratio is the value stored in the limit 128 to the maximum ratio between the expandable memory size and the normally operating memory size indicated in FIG. 15. If the designated maximum ratio is 4.0 as described above, the firmware 121 verifies whether the Expression 2 is satisfied. That is, a check is made to see if:

{total memory size−normally operating memory size at the time of booting}/normally operating memory size at the time of booting $\geq$ 4.0

Step 830 is reached only if both the normally operating memory size lower limit and the limit to the maximum ratio are met. In step 830, the firmware 121 sets {total memory size−normally operating memory size at the time of booting} to the expandable memory information 124, and terminates the expandable memory information setting process. If the normally operating memory size lower limit is not met, step 840 is reached. In step 840, the firmware 121 sets zero to the expandable memory information 124 before terminating the expandable memory information setting process. In other words, the firmware 121 inhibits memory expansion upon judging that the main memory management information 21 cannot be secured for the memory to be added. If the normally operating memory size lower limit is met but the limit to the maximum ratio is not satisfied, step 850 is reached. In step 850, the firmware 121 reduces the expandable memory size so that the limit to the maximum ratio will be satisfied. More specifically, the firmware 121 sets {normally operating memory size at the time of booting$\times$maximum ratio} to the expandable memory information 124 and terminates the process. If the limit 128 to the maximum ratio between the expandable memory size and the normally operating memory size is set for 4.0 as described above, the firmware 121 sets a value four times the normally operating memory size to the expandable memory information 124.

The interface with the other portions of the computer concerns the expandable memory information 124. This means that these portions of the computer of the third embodiment are the same with those of the first embodiment.

Although the Expressions 1 and 2 were presented above as conditional expressions to be met in terms of the expandable memory size and the normally operating memory size, this is not limitative of the invention. This invention also applies when other conditional expressions are suitably employed.

While preferred embodiments of the invention have been described using specific terms, such description is for illustrative purposes only, and it is to be understood that changes and variations may be made without departing from the spirit or scope of the following claims.

What is claimed is:

1. A computer system comprising:
   a processor generating an address of a virtual address system,
   a first main memory storing information which said processor processes, and
   a non-volatile storage storing first memory size information of said first main memory and second memory size information of a second main memory that is to be hot-added;
   wherein said processor has an address translating unit translating virtual addresses and physical addresses and said processor outputs physical addresses representing a region of said first main memory;
   wherein said main memory stores at least a part of a first page structure of said region for said first main memory and has a region for a second page structure of said second main memory, and wherein said processor accesses said first main memory using said first page structure; and
   wherein said main memory has an untranslatable region and stores said first page structure and said region for said second page structure in said untranslatable region.

2. A computer system supporting a virtual memory system, said computer system comprising,
   a processor,
   a first main memory which said processor accesses,
   a non-volatile storage storing configuration information regarding a second main memory to be hot plugged;
   wherein said first main memory has at least a part of address translation information for said first main memory and has a first region in which address translation information for said second main memory is to be stored;
   wherein said processor has a unit translating logical-physical addresses, accesses said address translation information for said first main memory and generates physical addresses; and
   wherein said first main memory stores said address translation information for said first main memory in a top priority region of interrupt handling and assigns said first region in said top priority region.

3. A computer system comprising,
   a first main memory,
   a processor processing information stored in said first main memory,
   a non-volatile storage storing memory information of a second memory to be hot-inserted while said computer system being powered;
   wherein said first main memory has at least part of first logical-physical address translating pairs of said first main memory and has an assigned region to store second logical-physical address translating pairs of said second main memory,
   wherein said first logical-physical address translating pairs are used for said processor accessing said first main memory; and
   wherein said first main memory has an untranslatable region and stores said first logical-physical address translating pairs in said untranslatable region.

4. A computer system allowing a main memory to be hot-added while said computer system is powered on, comprising,
   a first main memory,
   a processor accessing said first main memory with a virtual memory system,
   a non-volatile storage storing size information of main memory to be hot-added while powered on;
   wherein said first main memory has an untranslatable region and stores said first logical-physical address translating table in said untranslatable region; and
   wherein said first main memory further assigns said region to store a second logical-physical address translating table for said main memory to be hot-added in said untranslatable region.

* * * * *